United States Patent
Joshi et al.

(10) Patent No.: US 11,024,921 B2
(45) Date of Patent: Jun. 1, 2021

(54) COMPONENT INSULATION SYSTEMS

(71) Applicant: Toyota Motor Engineering & Manufacturing North America, Inc., Erlanger, KY (US)

(72) Inventors: Shailesh N. Joshi, Ann Arbor, MI (US); Ercan M. Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 707 days.

(21) Appl. No.: 15/165,228

(22) Filed: May 26, 2016

(65) Prior Publication Data

US 2017/0346056 A1 Nov. 30, 2017

(51) Int. Cl.
*H01M 50/24* (2021.01)
*H01M 10/66* (2014.01)
*H01M 50/30* (2021.01)
*H01M 10/617* (2014.01)
*H01M 10/625* (2014.01)
*B60R 13/08* (2006.01)

(52) U.S. Cl.
CPC ......... *H01M 50/24* (2021.01); *B60R 13/0876* (2013.01); *H01M 10/66* (2015.04); *H01M 50/30* (2021.01); *H01M 10/617* (2015.04); *H01M 10/625* (2015.04); *H01M 2220/20* (2013.01)

(58) Field of Classification Search
CPC ...... H01M 2/1094; H01M 10/66; H01M 2/12; H01M 10/617; H01M 10/625; H01M 2220/20; B60R 13/0876
See application file for complete search history.

(56) References Cited

U.S. PATENT DOCUMENTS

| 5,160,769 A | 11/1992 | Garrett |
| 7,313,926 B2 | 1/2008 | Gurlin |
| 7,462,963 B2 * | 12/2008 | Ishihara ................... H02K 9/20 310/58 |

(Continued)

FOREIGN PATENT DOCUMENTS

| CN | 103779629 A * | 5/2014 |
| WO | WO9621564 | 7/1996 |

(Continued)

OTHER PUBLICATIONS

English machine translation of Shufu (CN 103779629 A) (Year: 2014).*

(Continued)

*Primary Examiner* — Brian R Ohara
(74) *Attorney, Agent, or Firm* — Dinsmore & Shohl, LLP

(57) ABSTRACT

An insulation system for a vehicle includes a vehicle component that operates at an operating temperature that is higher than an initial temperature, an insulation member thermally coupled to the vehicle component and thermally coupled to an ambient medium, the insulation member including an enclosed chamber, the enclosed chamber including a chamber wall that defines an interior volume, and carbon dioxide positioned within the interior volume of the enclosed chamber, where the chamber wall prevents flow of the carbon dioxide out of the enclosed chamber.

16 Claims, 5 Drawing Sheets

(56) References Cited

U.S. PATENT DOCUMENTS

2011/0003224 A1* 1/2011 Scheibert .......... H01M 8/04059
                                                         429/434
2013/0189558 A1   7/2013 Haussmann
2017/0297431 A1* 10/2017 Epstein .................... F01P 3/20

FOREIGN PATENT DOCUMENTS

WO    WO2003006870        1/2003
WO    WO2005071696        8/2005
WO    WO-2016054068 A1 *  4/2016  ................ F01P 3/20

OTHER PUBLICATIONS

"CO2 Insulation for Thermal Control of the Mars Science Laboratory", http://enu.kz/repository/2011/AIAA-2011-5119.pdf.; access date: Dec. 22, 2015.
"Carbon Dioxide—Challenges and Opportunities", http://www.slb.com/~/media/Files/resources/oilfield_reviews/ors15/sept15/04_co2.pdf; Access Date: Dec. 22, 2015.

* cited by examiner

COMPONENT INSULATION SYSTEMS

TECHNICAL FIELD

The present specification relates to insulation systems for heat generating components, and in particular to insulation systems including an enclosed chamber filled with carbon dioxide.

BACKGROUND

Vehicles may include various components that provide or assist in providing the vehicle with motive force. For example, some vehicles may include an internal combustion engine that provides motive force to the vehicle. Some vehicles, such as electric vehicles and hybrid-electric vehicles, may include batteries and power electronics that assist in providing motive force to the vehicle.

Each of these vehicle components may operate at an operating temperature that is higher than an initial temperature. In particular, when the vehicle is not in use, the vehicle components (i.e., the internal combustion engine, the battery, and/or the power electronics) may each be at an initial temperature. When the vehicle is in operation, the vehicle components generate heat and increase in temperature to their respective operating temperatures.

To assist in optimizing the performance of the vehicle components, it is desirable to insulate the vehicle components as the vehicle components increase in temperature from their initial temperatures to their operating temperatures, thereby reducing the amount of time for the vehicle components to reach their operating temperatures. However, upon reaching their respective operating temperatures, it may be desirable to dissipate heat from the vehicle components so that the vehicle components do not overheat.

Accordingly, a need exists for insulation systems that selectively insulate a vehicle component, providing insulation while the vehicle component increases in temperature to an operating temperature, and dissipating heat from the vehicle component when the vehicle component achieves the operating temperature.

SUMMARY

In one embodiment, an insulation system for a vehicle includes a vehicle component that operates at an operating temperature that is higher than an initial temperature, an insulation member thermally coupled to the vehicle component and thermally coupled to an ambient medium, the insulation member including an enclosed chamber, the enclosed chamber including a chamber wall that defines an interior volume, and carbon dioxide positioned within the interior volume of the enclosed chamber, where the chamber wall prevents flow of the carbon dioxide out of the enclosed chamber.

In another embodiment, a vehicle includes an electronic component that operates at an operating temperature that is higher than an initial temperature, an insulation member thermally coupled to the electronic component and thermally coupled to an ambient medium, the insulation member including an enclosed chamber, the enclosed chamber including a chamber wall that defines an interior volume, and carbon dioxide positioned within the interior volume of the enclosed chamber, where the chamber wall prevents flow of the carbon dioxide out of the enclosed chamber.

In yet another embodiment, an insulation system for a vehicle includes a vehicle component that operates at an operating temperature that is higher than an initial temperature, an insulation member including an enclosed chamber that is thermally coupled to the vehicle component and that is thermally coupled to an ambient medium, where the insulation member selectively provides insulation to the vehicle component, the insulation member including a first thermal conductivity when the vehicle component has a temperature that is below the operating temperature, and a second thermal conductivity when the vehicle component has a temperature that is above the operating temperature, where the second thermal conductivity is greater than the first thermal conductivity.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Insulation systems according to the present disclosure include a vehicle component and an insulation member thermally coupled to the vehicle component and an ambient medium. In embodiments, the insulation member is filled with carbon dioxide and selectively provides thermal insulation to the vehicle component. By selectively providing thermal insulation to the vehicle component, the insulation member may assist the vehicle component in retaining thermal energy when the vehicle component is below an operating temperature, and may allow the vehicle component to dissipate thermal energy when the vehicle component is above the operating temperature. These and other embodiments will be described in more detail below in reference to the appended drawings.

The phrase "thermally coupled" is used herein to describe the interconnectivity of various components of the insulation system and means that the components are coupled to one another such that thermal energy may be exchanged between the components. Components that are thermally coupled may be directly coupled or may be coupled via an intermediate, thermally conductive substrate layer (for example and without limitation, thermal paste, grease, epoxy, direct bonded copper (DBC), direct bonded aluminum (DBA), or similar materials) and may be coupled by bonding techniques such as soldering, transient liquid phase bonding (TLP), or nano-silver sintering, for example. Alternatively, components that are thermally coupled may be detached from one another, but placed proximate to one another such that thermal energy may be exchanged between the components.

Figure 1:
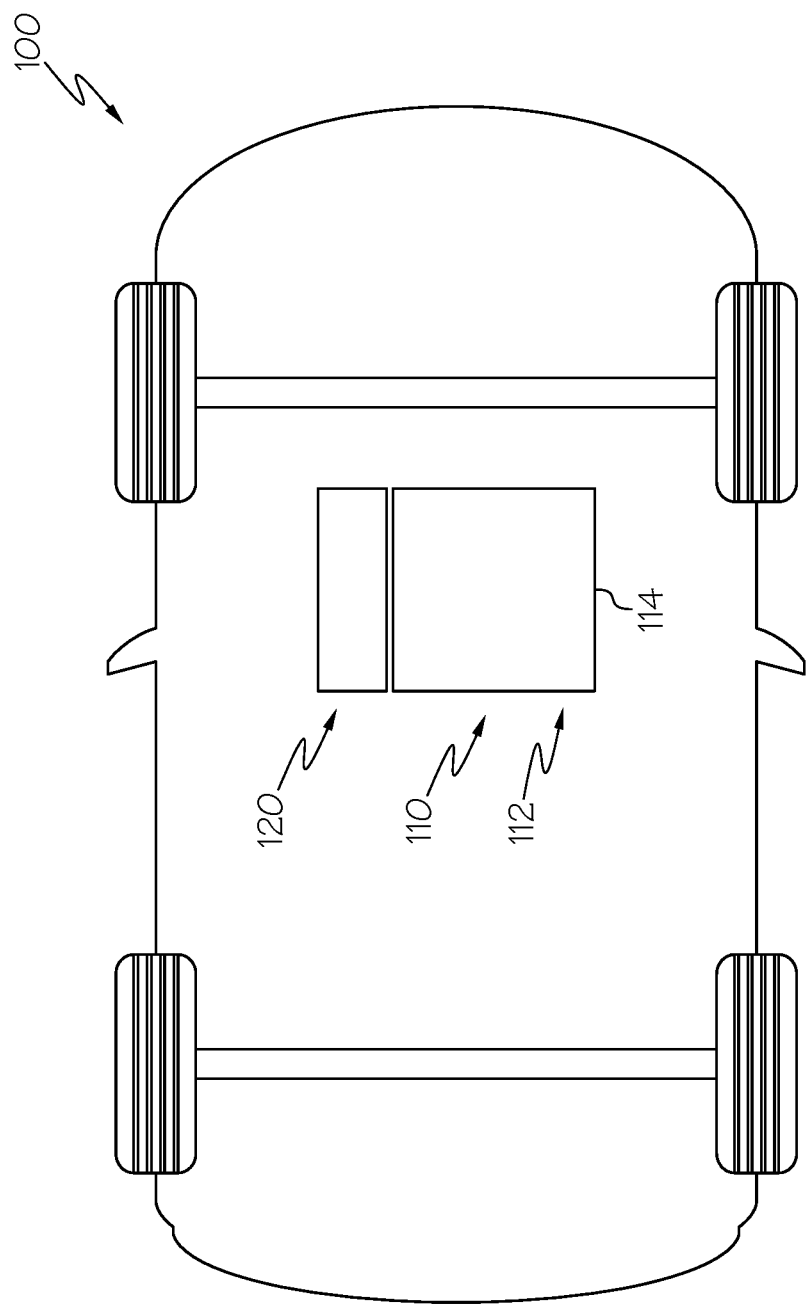
FIG. 1 schematically depicts a vehicle including an insulation member according to one or more embodiments shown and described herein.

Referring initially to FIG. 1, a vehicle 100 is schematically depicted. The vehicle 100 includes a heat generating component, such as a vehicle component 110 that provides or assists in providing motive force to the vehicle 100. In embodiments, the vehicle component 110 includes an electronic component 112, such as may be included in inverter/converter circuits in hybrid electric vehicles, plug-in hybrid electric vehicles, electric vehicles, and the like. In the embodiment depicted in FIG. 1, the electronic component 112 includes a battery 114. In some embodiments, the vehicle component 110 may include an internal combustion engine or other component that provides or assists in providing motive force to the vehicle 100.

The vehicle component 110 may operate at an operating temperature may be higher than an initial temperature. In particular, when the vehicle 100 is not in operation, the vehicle component 110 have an initial temperature that generally corresponds to an ambient temperature, such as the temperature of air surrounding the vehicle 100. In some instances, such as when the vehicle 100 is in a relatively cold environment, the ambient temperature and the initial temperature of the vehicle component 110 may be less than the operating temperature of the vehicle component 110. When the vehicle 100 is in operation, the vehicle component 110 generates heat, and the vehicle component 110 increases in temperature to the operating temperature.

In some embodiments, the battery 114 may have an operating temperature that is greater than 30 degrees Celsius (° C.). In some embodiments, the battery 114 may have an operating temperature that is about 30° C. In yet other embodiments the battery 114 may have an operating temperature that is between 25° C. and 35° C., inclusive of the endpoints. Vehicle components 110, such as the battery 114, may operate more effectively when at the operating temperature as compared to when the vehicle component 110 operates at a temperature that is below the operating temperature.

Figure 2:
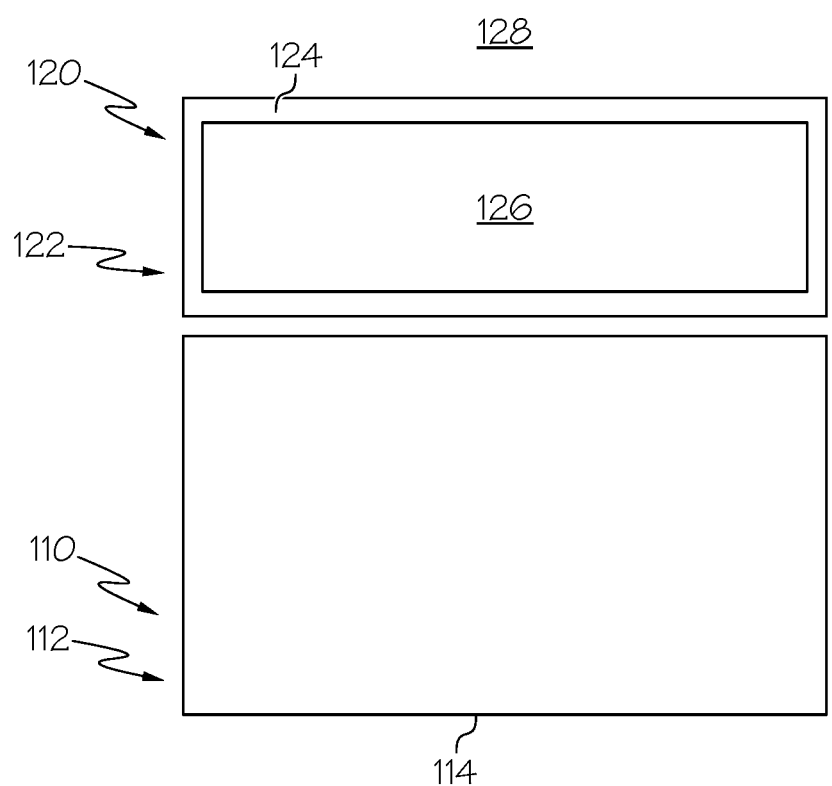
FIG. 2 schematically depicts the insulation member of FIG. 1 thermally coupled to a vehicle component according to one or more embodiments shown and described herein.

Referring to FIG. 2, an enlarged view of the vehicle component 110 is schematically depicted. The vehicle component 110 is thermally coupled to an insulation member 120, such that thermal energy may be exchanged between the vehicle component 110 and the insulation member 120. The insulation member 120 includes an enclosed chamber 122 including a chamber wall 124. The enclosed chamber 122 may be formed from aluminum, copper, an aluminum/copper composite, or the like, and may be formed through any suitable process, including casting, forging, or the like.

The chamber wall 124 of the insulation member 120 defines an interior volume 126 positioned within the chamber wall 124. In the embodiment depicted in FIG. 2, the enclosed chamber 122 is depicted as including a rectangular shape, however, it should be understood that the enclosed chamber 122 may include any suitable shape thermally coupled to the vehicle component 110.

The insulation member 120 is thermally coupled to an ambient medium 128, such that thermal energy may be exchanged between the insulation member 120 and the ambient medium 128. The ambient medium 128 may include air surrounding the insulation member 120. Alternatively, the ambient medium 128 may include a heat sink thermally coupled to the insulation member, where thermal energy may be exchanged between the heat sink and the insulation member 120.

In embodiments, the interior volume 126 of the insulation member 120 is filled or at least partially filled with carbon dioxide. By filling the interior volume 126 with carbon dioxide, as the carbon dioxide changes phase (i.e., between a liquid/gas mixture and a supercritical fluid or between a liquid gas/mixture and a gas), the insulation member 120 may selectively provide thermal insulation to the vehicle component 110. In particular, the insulation member 120 provides thermal insulation to the vehicle component 110 when the insulation member 120 is below the operating temperature and allows the vehicle component 110 to dissipate heat when the insulation member 120 is above the operating temperature. While the embodiments described herein describe the insulation member 120 providing selective insulation to the vehicle component 110, it should be understood that the insulation member 120 may be thermally coupled to and provide selective insulation to any suitable heat generating component. For example, the insulation member 120 may be thermally coupled to and provide selective insulation to various consumer electronics, robotic components, or other components that have an operating temperature that is higher than an initial temperature.

Figure 3:
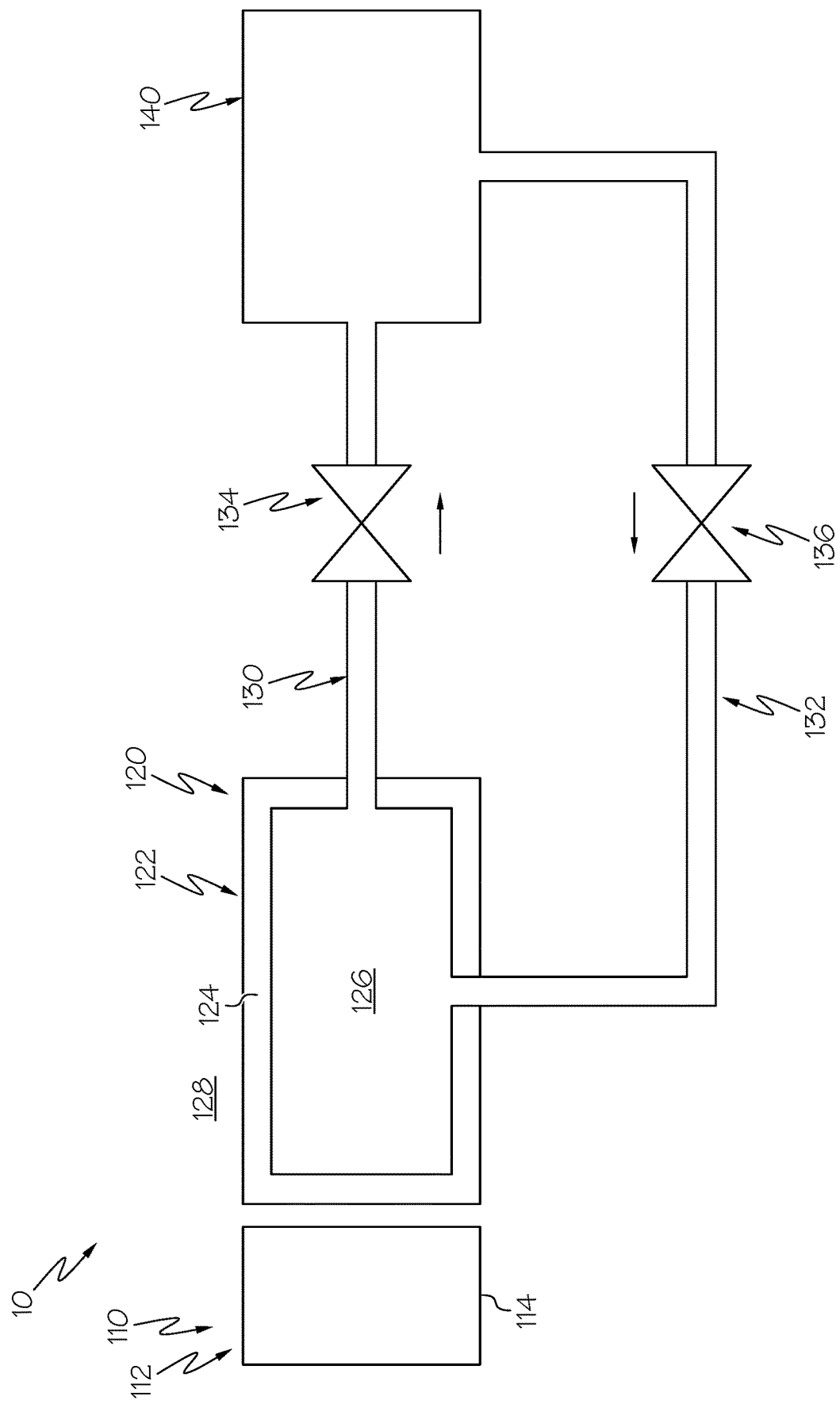
FIG. 3 schematically depicts the insulation member of FIG. 1 in fluid communication with a reservoir according to one or more embodiments shown and described herein.

Referring to FIG. 3, an insulation system 10 including the insulation member 120 is schematically depicted. The insulation member 120 is in fluid communication with a reservoir 140. In particular, the insulation member 120 may be coupled to a conduit 130 that is coupled to the reservoir 140, such that carbon dioxide may flow between the insulation member 120 and the reservoir 140.

A release valve 134 is positioned between the insulation member 120 and the reservoir 140 such that carbon dioxide may flow from the insulation member 120 to the reservoir 140, but is blocked from flowing from the reservoir 140 to the insulation member. The release valve 134 is repositionable between an open position, in which carbon dioxide may flow from the insulation member 120 to the reservoir 140, and a closed position, in which carbon dioxide is blocked from flowing from the insulation member 120 to the reservoir 140. The release valve 134 may be a pressure release valve, such that movement between the closed position and the open position is based on the pressure of the carbon dioxide in the insulation member 120. When the pressure of the carbon dioxide in the insulation member 120 exceeds a predetermined pressure, the release valve 134 may reposition from the closed position to the open position, allowing carbon dioxide to flow from the insulation member 120 to the reservoir 140. As carbon dioxide flows from the insulation member 120 to the reservoir 140, the pressure of the carbon dioxide in the insulation member 120 may decrease. As the pressure of the carbon dioxide in the insulation member 120 decreases, the pressure of the carbon dioxide in the insulation member 120 may lower below the predetermined pressure, causing the release valve 134 to reposition from the open position to the closed position. In this way, the release valve 134 may assist in regulating the pressure of the carbon dioxide in the insulation member 120.

In the embodiment depicted in FIG. 3, the insulation system 10 includes a return conduit 132 that is coupled to the reservoir 140 and the insulation member 120, such that carbon dioxide may flow from the reservoir 140 to the insulation member 120. The return conduit 132 may include a return valve 136 that allows carbon dioxide to flow from the reservoir 140 to the insulation member 120, while blocking flow of carbon dioxide from the insulation member 120 to the reservoir 140. The return valve 136 is repositionable between an open position, in which carbon dioxide may flow from the reservoir 140 to the insulation member 120, and a closed position, in which carbon dioxide is blocked from flowing from the reservoir 140 to the insulation member 120.

The return valve 136 may be a pressure release valve, such that movement between the closed position and the open position is based on the pressure of the carbon dioxide in the insulation member 120. When the pressure of the carbon dioxide in the insulation member 120 is below a predetermined pressure, the return valve 136 may reposition from the closed position to the open position, allowing carbon dioxide to flow from the reservoir 140 to the insulation member 120. As carbon dioxide flows to the insulation member 120 from the reservoir 140, the pressure of the carbon dioxide in the insulation member 120 may increase. As the pressure of the carbon dioxide in the insulation member 120 increases, the pressure of the carbon dioxide in the insulation member 120 may increase above the predetermined pressure, which may cause the return valve 136 to reposition from the open position to the closed position. In this way, the return valve 136 may assist in regulating the pressure of the carbon dioxide in the insulation member 120. In some embodiments, a pump may induce flow of carbon dioxide from the reservoir 140 to the insulation member 120 when the pressure of the carbon dioxide within the insulation member 120 is below the predetermined pressure, further assisting in maintaining the pressure of the carbon dioxide within the insulation member 120.

Figure 4:
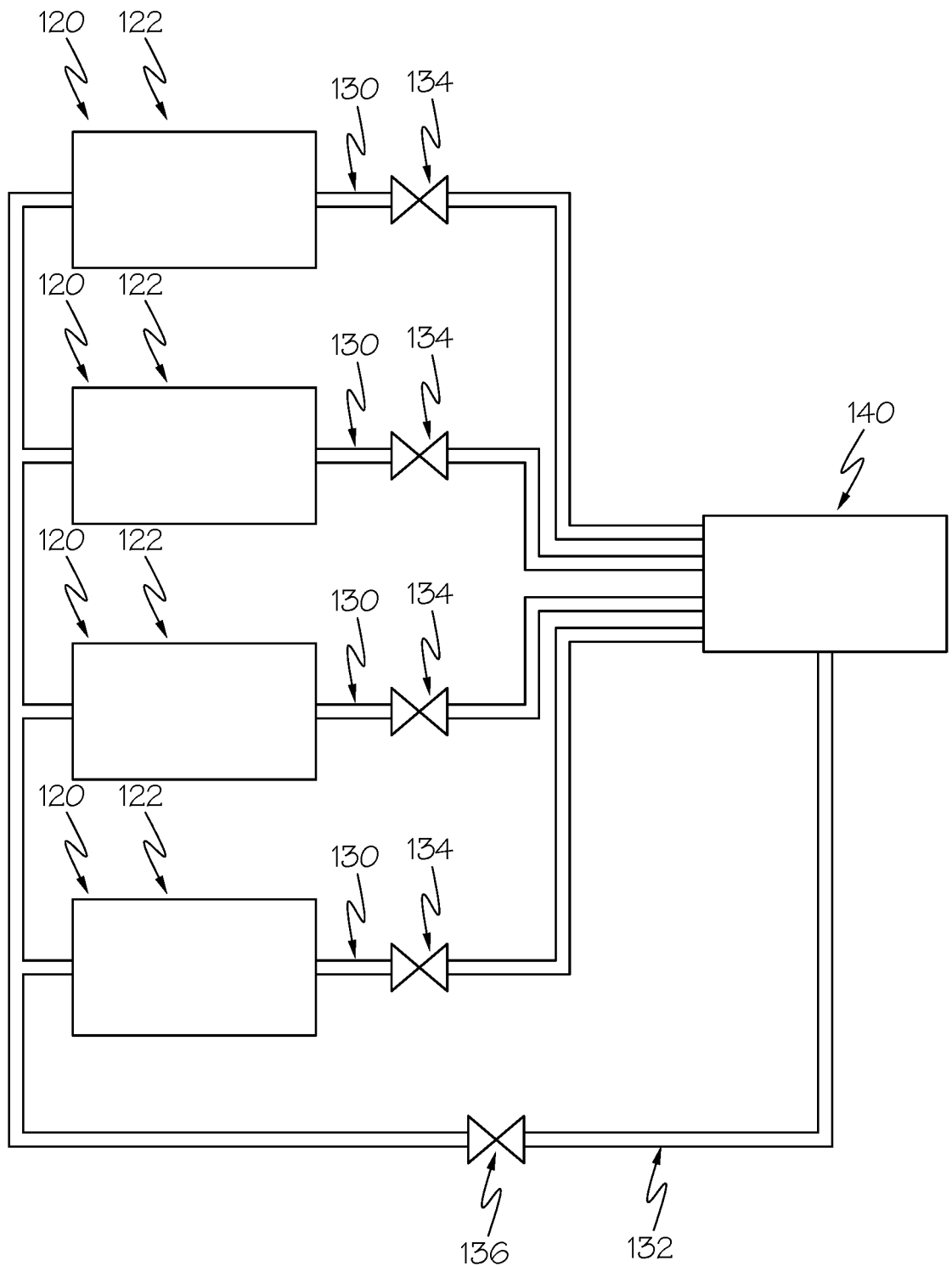
FIG. 4 schematically depicts multiple insulation members in fluid communication with the reservoir of FIG. 3, according to one or more embodiments shown and described herein.

Referring to FIG. 4, in some embodiments, the insulation system 10 may include multiple insulation members 120. Each of the insulation members 120 is thermally coupled to the vehicle component 110 (FIG. 3) and are in fluid communication with the reservoir 140. In some embodiments, each of the insulation members 120 may be thermally coupled to separate vehicle components. Each of the insulation members 120 are coupled to the reservoir 140 by a conduit 130 that allows the flow of carbon dioxide from the insulation members 120 to the reservoir 140. Release valves 134 are positioned on the conduits 130 between the insulation members 120 and the reservoir 140. Similar to the embodiment shown in FIG. 3, carbon dioxide from each of the insulation members 120 may flow to the reservoir 140 through the conduits 130, but may be blocked from flowing from the reservoir 140 to each of the insulation members 120 through the conduits 130 by each of the release valves 134. As described above, each of the of the release valves 134 are repositionable between an open position and a closed position, such that the release valves 134 may assist in regulating the pressure of the carbon dioxide in the insulation members 120.

In the embodiment depicted in FIG. 4, the insulation system 10 further includes a return conduit 132 coupled to the reservoir 140 and the insulation members 120, the return conduit 132 allowing flow of carbon dioxide from the reservoir 140 to the insulation members 120. A return valve 136 is positioned on the return conduit 132 between the reservoir 140 and the insulation members 120. Similar to the embodiment shown in FIG. 3, carbon dioxide from the reservoir 140 may flow to each of the insulation members 120, but may be blocked from flowing to the reservoir 140 through the return conduit 132 by the return valve 136. As described above, the return valve 136 is repositionable between an open position and a closed position, such that the return valve 136 may assist in regulating the pressure of the carbon dioxide in the insulation members 120. While the embodiment depicted in FIG. 4 shows a single return valve 136, it should be understood that any suitable number of return valves may be positioned between the reservoir 140 and the insulation members 120, and individual return valves 136 may be positioned between each of the insulation members 120 and the reservoir 140. In some embodiments, a pump may induce flow of carbon dioxide from the reservoir 140 to each of the insulation members 120 when the pressure of the carbon dioxide within the insulation members 120 is below the predetermined pressure, further assisting in maintaining the pressure of the carbon dioxide within each of the insulation member 120.

Operation of the insulation system 10 will now be described with specific reference to the figures.

Referring to FIG. 3, as the insulation member 120 is thermally coupled to the vehicle component 110, when the vehicle component 110 has a temperature that is less than the operating temperature, the carbon dioxide positioned within the enclosed chamber 122 may similarly have a temperature that is less than the operating temperature. When the vehicle 100 (FIG. 1) is in operation, thermal energy generated by the vehicle component 110 may be transferred to the insulation member 120, causing the temperature of the carbon dioxide within the insulation member 120 to increase. When the vehicle component 110 has a temperature that is greater than the operating temperature, the carbon dioxide positioned within the enclosed chamber 122 may similarly have a temperature that is greater than the operating temperature. As the carbon dioxide is positioned within the enclosed chamber 122, when the temperature of the carbon dioxide increases, the pressure of the carbon dioxide within the enclosed chamber 122 may similarly increase.

Figure 5:
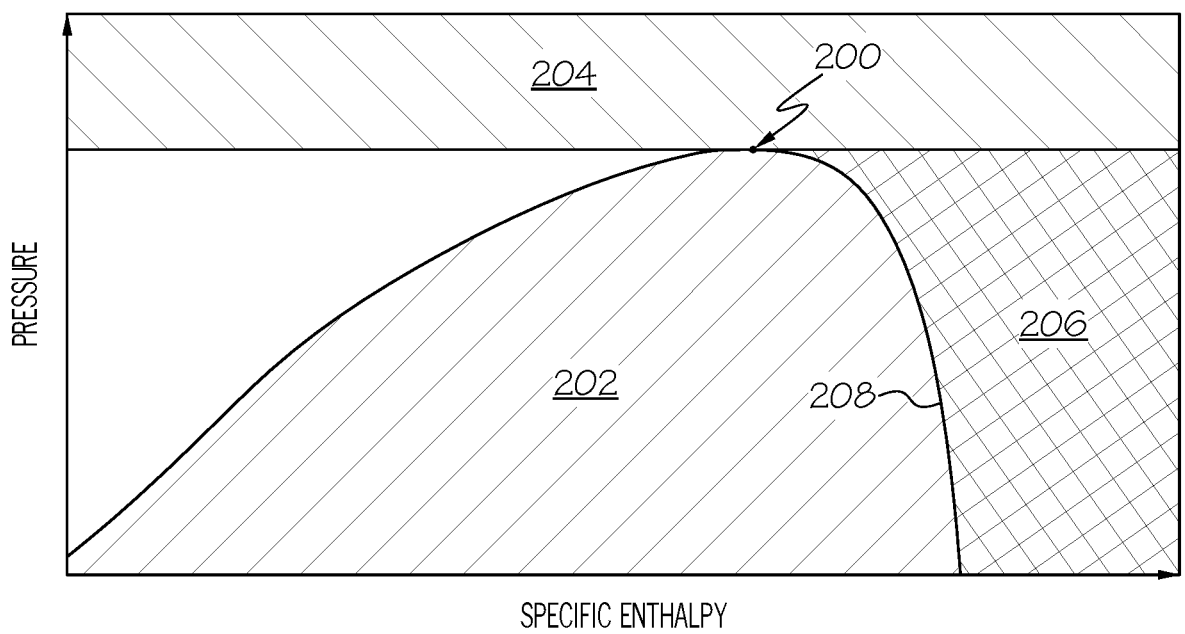
FIG. 5 schematically depicts a pressure-specific enthalpy graph of carbon dioxide positioned within the insulation member of FIG. 1 according to one or more embodiments shown and described herein.

Referring collectively to FIGS. 3 and 5, the insulation system 10 and a pressure-specific enthalpy graph of the carbon dioxide positioned within the enclosed chamber 122 are schematically depicted, respectively. When the carbon dioxide positioned within the enclosed chamber 122 has a temperature that is less than the operating temperature, the carbon dioxide has a pressure and a specific enthalpy such that the carbon dioxide is in an initial phase, shown in FIG. 5 as area 202. In the embodiment depicted in FIG. 5, the carbon dioxide is a liquid/gas mixture in the initial phase 202.

As the vehicle component 110 heats the insulation member 120, the temperature of the carbon dioxide within the enclosed chamber 122 rises, and accordingly, the pressure of the carbon dioxide within the enclosed chamber 122 rises. The pressure of the carbon dioxide may rise until the carbon dioxide reaches a critical point 200. Once the pressure of the carbon dioxide reaches the critical point 200, the carbon dioxide changes from the initial phase 202 to an operating phase. Upon reaching the critical point 200, the release valve 134 may selectively change between the open position and the closed position to maintain the pressure of the carbon dioxide in the enclosed chamber 122 at the critical point 200. Alternatively, the release valve 135 may selectively change between the open position and the closed position to maintain the pressure of the carbon dioxide in the enclosed chamber at a pressure that exceeds the critical point 200, such that the carbon dioxide is positioned in the area shown as area 204.

In embodiments, the insulation member 120 is configured such that the critical point 200 corresponds to a temperature of the carbon dioxide that is about the same as the operating temperature of the vehicle component 110. In particular, in embodiments, the pressure of the carbon dioxide in the initial phase 202 may be regulated, such as through selectively opening and closing the return valve 136 and/or through the use of a pump, to maintain the pressure of the carbon dioxide in the initial phase 202, such that when the carbon dioxide is at the operating temperature, the carbon dioxide has a pressure and specific enthalpy that corresponds to the critical point 200. Accordingly, when the carbon dioxide is at or exceeds the operating temperature, the carbon dioxide is in the operating phase at the critical point 200, while the carbon dioxide is in the initial phase 202 when the carbon dioxide is at a temperature that is less than the operating temperature.

Alternatively, in some embodiments, the insulation member 120 is configured such that the critical point 200 corresponds to a temperature of the carbon dioxide that is less than the operating temperature of the vehicle component 110. In some embodiments, the insulation member 120 is configured such that the critical point 200 corresponds to a temperature of the carbon dioxide that is 1° C. less than the operating temperature of the vehicle component.

Alternatively, as the vehicle component 110 heats the insulation member 120, the pressure of the carbon dioxide within the enclosed chamber 122 may be maintained at a constant or near constant pressure, for example through selectively opening and closing the release valve 134. Instead, as the temperature of the carbon dioxide within the enclosed chamber 122 increases, the specific enthalpy of the carbon dioxide within the enclosed chamber 122 increases. As the specific enthalpy of the carbon dioxide increases, the carbon dioxide changes from the initial phase 202 to an operating phase, shown in FIG. 5 as area 206. In the embodiment depicted in FIG. 5, the carbon dioxide is a gas in the operating phase when the carbon dioxide is in the area 206.

The initial phase 202 of the carbon dioxide is separated from the operating phase area 206 by a curve 208. The curve 208 also separates the operating phase area 206 from a liquid phase area positioned to the left of the curve 208. In embodiments, the carbon dioxide within the enclosed chamber 122 may be maintained at a predetermined constant pressure such that the curve 208 at the predetermined constant pressure corresponds to the operating temperature of the vehicle component 110. In particular, when the carbon dioxide has a temperature that corresponds to the operating temperature of the vehicle component 110, the carbon dioxide has a pressure and specific enthalpy such that the carbon dioxide is on the curve 208 shown in FIG. 5. Accordingly, when the carbon dioxide is at or exceeds the operating temperature, the carbon dioxide is in the operating phase area 206, while the carbon dioxide is in the initial phase 202 when the carbon dioxide is at a temperature that is less than the operating temperature.

Alternatively, in some embodiments, the insulation member 120 is configured such that the curve 208 at the predetermined constant pressure corresponds to a temperature of the carbon dioxide that is less than the operating temperature of the vehicle component 110. In some embodiments, the insulation member 120 is configured such that the curve 208 at the predetermined constant pressure corresponds to a temperature of the carbon dioxide that is 1° C. less than the operating temperature of the vehicle component.

Without being be bound by theory, when matter changes phases, such as between a liquid/gas mixture and a supercritical fluid, or between a liquid/gas mixture and a gas, the thermal conductivity of the matter changes. For example, carbon dioxide has a lower thermal conductivity as a liquid/gas mixture as compared to when the carbon dioxide is at the critical point or above the critical point and is a supercritical fluid. In some instances, the thermal conductivity of carbon dioxide is 10 to 15 times greater when the carbon dioxide is at the critical point compared to the liquid/gas mixture phase. Similarly, carbon dioxide has a lower thermal conductivity in the liquid/gas mixture phase and the supercritical fluid phase as compared to when the carbon dioxide is in the gas phase.

When the carbon dioxide within the enclosed chamber 122 is in the initial phase 202 (i.e., in the liquid/gas mixture), the carbon dioxide, and accordingly the insulation member 120, has a first thermal conductivity. When the carbon dioxide is in the operating phase (i.e., at the critical point 200, the area 204, or the area 206) such that the carbon dioxide is at the critical point 200 or in the supercritical fluid or in the gas phase, the carbon dioxide, and accordingly the insulation member 120, has a second thermal conductivity, where the second thermal conductivity is greater than the first thermal conductivity. Because the carbon dioxide has the second thermal conductivity in the operating phase (i.e., at the critical point 200, the area 204, or the area 206) that is greater than the first thermal conductivity in the initial phase 202, the carbon dioxide, and accordingly the insulation member 120 may allow more thermal energy to be transmitted through the insulation member 120 when the carbon dioxide is in the operating phase.

By selecting the critical point 200 to correspond to the operating temperature of the vehicle component 110, the carbon dioxide, and accordingly the insulation member 120, has the first thermal conductivity when the insulation member 120 is below the operating temperature. However, when the insulation member 120 is at or above the operating temperature, the carbon dioxide within the enclosed chamber 220 changes phase between the initial phase 202 and the operating phase at the critical point 200, and accordingly, the insulation member 120 has the second thermal conductivity that is greater than the first thermal conductivity. In this way, when the insulation member 120 is below the operating temperature, the insulation member 120 has the first thermal conductivity and provides thermal insulation to the vehicle component 110, assisting the vehicle component 110 in retaining thermal energy. When the insulation member 120 is at or above the operating temperature, the insulation member 120 has the second thermal conductivity that is greater than the first thermal conductivity, which allows the insulation member 120 to assist in dissipating heat from the vehicle component 110 to the ambient medium 128.

Similarly, in embodiments where the carbon dioxide is maintained at a constant pressure, by selecting the pressure of the carbon dioxide such that the curve 208 corresponds to the operating temperature of the vehicle component 110, the carbon dioxide, and accordingly the insulation member has the first thermal conductivity when the insulation member 120 is below the operating temperature. However when the insulation member 120 is at or above the operating temperature, the carbon dioxide within the enclosed chamber 220 changes phase between the initial phase 202 and the operating phase at area 206 (i.e., gas phase), and accordingly, the insulation member 120 has the second thermal conductivity that is greater than the first thermal conductivity. In this way, when the insulation member 120 is below the operating temperature, the insulation member 120 has the first thermal conductivity and provides thermal insulation to the vehicle component 110, assisting the vehicle component 110 in retaining thermal energy. When the insulation member 120 is at or above the operating temperature, the insulation member 120 has the second thermal conductivity that is greater than the first thermal conductivity, which allows the insulation member 120 to assist in dissipating heat from the vehicle component 110 to the ambient medium 128.

It should now be understood that insulation systems according to the present disclosure include a vehicle component and an insulation member thermally coupled to the vehicle component and an ambient medium. In embodiments, the insulation member is filled with carbon dioxide and selectively provides thermal insulation to the vehicle component. By selectively providing thermal insulation to the vehicle component, the insulation member may assist the vehicle component in retaining thermal energy when the vehicle component is below an operating temperature, and may allow the vehicle component to dissipate thermal energy when the vehicle component is above the operating temperature.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An insulation system for a vehicle comprising:
    a vehicle component that operates at an operating temperature that is higher than an initial temperature;
    an insulation member thermally coupled to the vehicle component and thermally coupled to an ambient medium, the insulation member comprising an enclosed chamber, the enclosed chamber comprising a chamber wall that defines an interior volume;
    carbon dioxide positioned within the interior volume of the enclosed chamber, wherein:
        the chamber wall prevents flow of the carbon dioxide out of the enclosed chamber;
        the carbon dioxide comprises an initial phase and an operating phase, wherein the carbon dioxide comprises a liquid/gas mixture in the initial phase;
        the carbon dioxide is in the initial phase when the vehicle component is at a temperature that is below the operating temperature; and
        the carbon dioxide is in the operating phase when the vehicle component is at a temperature that is above the operating temperature;
    a reservoir in fluid communication with the enclosed chamber, such that the carbon dioxide flows between the enclosed chamber and the reservoir; and
    a valve positioned between the enclosed chamber and the reservoir, wherein the valve selectively opens and closes to maintain the carbon dioxide within the enclosed chamber, such that when the carbon dioxide is at the operating temperature, the carbon dioxide has a pressure and specific enthalpy that corresponds to at least one of a critical point of the carbon dioxide, a supercritical fluid phase of the carbon dioxide, and a gas phase of the carbon dioxide.

2. The insulation system of claim 1, wherein the carbon dioxide is at the critical point in the operating phase.

3. The insulation system of claim 1, wherein the carbon dioxide comprises a gas in the operating phase.

4. The insulation system of claim 1, wherein the valve is repositionable between an open position, in which the carbon dioxide flows from the enclosed chamber to the reservoir, and a closed position, in which the carbon dioxide is blocked from flowing from the enclosed chamber to the reservoir.

5. The insulation system of claim 4, wherein the valve is in the open position when the carbon dioxide in the enclosed chamber comprises a pressure that is above a predetermined pressure, and wherein the valve is in the closed position when the carbon dioxide in the enclosed chamber comprises a pressure that is below the predetermined pressure.

6. The insulation system of claim 4, wherein the valve is a release valve, and wherein the insulation system further comprises a return valve that is repositionable between an open position, in which the carbon dioxide flows from the reservoir to the enclosed chamber, and a closed position, in which the carbon dioxide is blocked from flowing from the reservoir to the enclosed chamber.

7. A vehicle comprising:
    an electronic component that operates at an operating temperature that is higher than an initial temperature;
    an insulation member thermally coupled to the electronic component and thermally coupled to an ambient medium, the insulation member comprising an enclosed chamber, the enclosed chamber comprising a chamber wall that defines an interior volume;
    carbon dioxide positioned within the interior volume of the enclosed chamber, wherein:
        the chamber wall prevents flow of the carbon dioxide out of the enclosed chamber;
        the carbon dioxide comprises an initial phase and an operating phase, wherein the carbon dioxide comprises a liquid/gas mixture in the initial phase;
        the carbon dioxide is in the initial phase when the electronic component is at a temperature that is below the operating temperature; and
        the carbon dioxide is in the operating phase when the electronic component is at a temperature that is above the operating temperature;
    a reservoir in fluid communication with the enclosed chamber, such that the carbon dioxide flows between the enclosed chamber and the reservoir; and
    a valve positioned between the enclosed chamber and the reservoir, wherein the valve selectively opens and closes to maintain the carbon dioxide within the enclosed chamber, such that when the carbon dioxide is at the operating temperature, the carbon dioxide has a pressure and specific enthalpy that corresponds to at least one of a critical point of the carbon dioxide, a supercritical fluid phase of the carbon dioxide, and a gas phase of the carbon dioxide.

8. The vehicle of claim 7, wherein the carbon dioxide is at the critical point in the operating phase.

9. The vehicle of claim 7, wherein the carbon dioxide comprises a gas in the operating phase.

10. The vehicle of claim 7, wherein the electronic component comprises a battery.

11. An insulation system for a vehicle comprising:
    a vehicle component that operates at an operating temperature that is higher than an initial temperature;

an insulation member comprising an enclosed chamber that is thermally coupled to the vehicle component and that is thermally coupled to an ambient medium, wherein the insulation member selectively provides insulation to the vehicle component, the insulation member comprising a first thermal conductivity when the vehicle component comprises a temperature that is below the operating temperature, and a second thermal conductivity when the vehicle component comprises a temperature that is above the operating temperature, wherein the second thermal conductivity is greater than the first thermal conductivity;

carbon dioxide positioned within the enclosed chamber, wherein:
  the carbon dioxide comprises an initial phase and an operating phase, wherein the carbon dioxide comprises a liquid/gas mixture in the initial phase;
  the carbon dioxide is in the initial phase when the vehicle component comprises a temperature that is below the operating temperature; and
  the carbon dioxide is in the operating phase when the vehicle component comprises a temperature that is above the operating temperature;

a reservoir in fluid communication with the enclosed chamber, such that the carbon dioxide flows between the enclosed chamber and the reservoir; and a valve positioned between the enclosed chamber and the reservoir, wherein the valve selectively opens and closes to maintain the carbon dioxide within the enclosed chamber, such that when the carbon dioxide is at the operating temperature, the carbon dioxide has a pressure and specific enthalpy that corresponds to at least one of a critical point of the carbon dioxide, a supercritical fluid phase of the carbon dioxide, and a gas phase of the carbon dioxide.

12. The insulation system of claim 11, wherein the carbon dioxide is at the critical point in the operating phase.

13. The insulation system of claim 11, wherein the carbon dioxide comprises a gas in the operating phase.

14. The insulation system of claim 11, wherein the vehicle component comprises a battery.

15. The insulation system of claim 11, wherein the valve is a release valve, and wherein the insulation system further comprises a return valve that is repositionable between an open position, in which the carbon dioxide flows from the reservoir to the enclosed chamber, and a closed position, in which the carbon dioxide is blocked from flowing from the reservoir to the enclosed chamber.

16. The vehicle of claim 7, wherein the valve is a release valve, and wherein the insulation system further comprises a return valve that is repositionable between an open position, in which the carbon dioxide flows from the reservoir to the enclosed chamber, and a closed position, in which the carbon dioxide is blocked from flowing from the reservoir to the enclosed chamber.

* * * * *